(12) United States Patent
Zhang

(10) Patent No.: US 11,313,395 B2
(45) Date of Patent: Apr. 26, 2022

(54) MATERIALS AND METHODS FOR JOINING METAL SHEETS

(71) Applicant: The University of Toledo, Toledo, OH (US)

(72) Inventor: Hongyan Zhang, Toledo, OH (US)

(73) Assignee: The University of Toledo, Toledo, OH (US)

( * ) Notice: Subject to any disclaimer, the term of this patent is extended or adjusted under 35 U.S.C. 154(b) by 259 days.

(21) Appl. No.: 16/552,197

(22) Filed: Aug. 27, 2019

(65) Prior Publication Data

US 2020/0072264 A1 Mar. 5, 2020

Related U.S. Application Data

(60) Provisional application No. 62/724,238, filed on Aug. 29, 2018.

(51) Int. Cl.
*F16B 35/04* (2006.01)
*F16B 5/02* (2006.01)
*F16B 5/04* (2006.01)

(52) U.S. Cl.
CPC ............. *F16B 5/0275* (2013.01); *F16B 5/04* (2013.01)

(58) Field of Classification Search
CPC ................................ F16B 5/04; F16B 5/0275
USPC ........................................................ 411/389
See application file for complete search history.

(56) References Cited

U.S. PATENT DOCUMENTS

| | | | | |
|---|---|---|---|---|
| 1,715,983 A * | 6/1929 | Fokko | ..................... | E04H 12/10 403/388 |
| 4,690,365 A * | 9/1987 | Miller | .................... | F16B 5/0233 248/188.4 |
| 6,758,512 B2 * | 7/2004 | Dobbs | .................... | B60J 5/0408 296/146.5 |
| 6,866,666 B1 * | 3/2005 | Sinnott | ................. | A61F 2/0805 606/302 |
| 7,386,960 B2 * | 6/2008 | Molteni | ................ | E04B 2/7433 160/135 |
| 8,551,137 B2 * | 10/2013 | Cohen | ................... | A61B 17/068 606/213 |
| 9,739,299 B2 * | 8/2017 | Nagashima | ............ | B23K 31/02 |
| 10,143,495 B2 * | 12/2018 | Sournac | ............. | A61B 17/7041 |
| 10,309,435 B2 * | 6/2019 | Couto Maquieira | . | F16B 5/0216 |
| 10,801,535 B2 * | 10/2020 | Brunk | ....................... | F16B 5/01 |
| 2010/0290862 A1 * | 11/2010 | Balsa Gonz Lez | ... | F16B 5/0275 411/214 |
| 2014/0301804 A1 * | 10/2014 | Spolyar | ................. | F16B 5/0233 411/107 |
| 2015/0003930 A1 * | 1/2015 | Plickys | ................. | F16B 5/0275 411/326 |

* cited by examiner

*Primary Examiner* — Gary W Estremsky
(74) *Attorney, Agent, or Firm* — MacMillan, Sobanski & Todd, LLC

(57) ABSTRACT

Embodiments of connectors for joining metal sheets, and methods of using the same, are described.

18 Claims, 20 Drawing Sheets
(10 of 20 Drawing Sheet(s) Filed in Color)

MATERIALS AND METHODS FOR JOINING METAL SHEETS

RELATED APPLICATIONS

This application claims priority to U.S. Provisional Application No. 62/724,238 filed under 35 U.S.C. § 111(b) on Aug. 29, 2018, the disclosure of which is incorporated herein by reference in its entirety.

STATEMENT REGARDING FEDERALLY SPONSORED RESEARCH

This invention was made with no government support. The government has no rights in this invention.

BACKGROUND

There are several current practices for joining aluminum plates or sheets.

One method for joining aluminum sheets is resistance spot welding (RSW). RSW is a process in which contacting metal surface points are joined by the heat obtained from resistance to electric current. Resistance welding is accomplished when current is caused to flow through electrode tips and the separate pieces of metal to be joined. The resistance of the base metal to electrical current flow causes localized heating in the joint and the weld is made. The process uses two shaped copper alloy electrodes to concentrate welding current into a small 'spot' and to simultaneously clamp the sheets together. Forcing a large current through the spot will melt the metal and form the mold. The amount of heat (energy) delivered to the spot is determined by the resistance between the electrodes and the magnitude and duration of the current. The amount of energy is chosen to match the sheet's material properties, its thickness, and type of electrodes.

However, RSW has its deficiencies. RSW is often subject to expulsion of molten metal from the interface of the joint thereby weakening the weld. There is a danger of developing defects such as voids and cracks and forming gas pockets which affect the appearance and quality of the weld. RSW of alloys is often subject to excessive distortion and residual stresses as well as short electrode life. Spot welding tends to harden the material causing it to warp. This reduces the material's fatigue strength, and may stretch the material as well as anneal it. The physical effects of spot welding include internal cracking, surface cracks, and a bad appearance. The physical/chemical properties affected include the metal's internal resistance and its corrosive properties.

Another method for joining adjacent metal sheets is friction stir welding (FSW). In FSW a rotating tool with a pin and shoulder is pressed into the joint between two pieces of metal and the tool is moved along the line of the joint to form a weld. The metals that are going to be joined must be clamped onto a backing bar so that their joint faces cannot be forced apart by the process. FSW performs two functions. First, it heats the workpiece to raise its temperature sufficiently to the stage at which it is not molten but plastically melted and second it moves along the edges of the workpiece to weld it or to make a joint. Once the process is started, the heating is created by friction between the tool and the workpiece and because of plastic deformation of the workpiece. The tool rotation leads to movement of material from the front of the pin to the back of the pin and this completes the welding.

However, FSW has its deficiencies. FSW leaves an exit hole after withdrawing the tool. Moreover, FSW requires heavy duty clamping to hold the material in place during the welding process because significant downward forces and traversing forces are applied by the tool. FSW lacks the flexibility of other welding processes, such as when metal deposition is required, and FSW is not suitable for joining thin sheets, curved joints, and sheets of dissimilar thickness.

Friction stir spot welding (FSSW) is a variant of friction stir welding. Both FSSW and FSW use a rotating tool with a pin to join metal sheets. However, in FSW the tool traverses along a seam between two metal plates while in FSSW the tool kept to one spot to form a spot weld. FSSW has limitations. For example, FSSW has medium shear load bearing capacity and low peel resistance.

Another method for joining metal sheets is self-piercing riveting. Self-piercing riveting is a high-speed mechanical fastening process for point joining sheet material, typically steels and aluminum alloys. Generally, the technique uses a semi-tubular rivet, or in some cases solid rivets, to clinch the sheets in a mechanical joint. The process starts by clamping the sheets between the die and the blankholder. The semi-tubular rivet is driven into the materials to be joined between a punch and die in a press tool. The rivet pierces the top sheet and the die shape causes the rivet to flare within the lower sheet to form a mechanical interlock. Self-piercing riveting also has drawbacks. For instance, self-piercing riveting requires significant clamping and a die.

There are difficulties in joining or welding aluminum sheets or plates, and known materials and methods for doing so have drawbacks. Thus, it would be advantageous to develop new and improved materials and methods for joining aluminum sheets or plates.

SUMMARY

Provided are improved connectors for joining aluminum sheets. A first embodiment of a connector may include a self-driven, uneven thread screw arrays. A second embodiment of a connector may include an array of punched cross-head protrusions. A third embodiment of a connector may include an array of forged semispherical-head protrusions. A fourth embodiment of a connector may include an array of forged arrow-head protrusions.

Provided herein is a connector comprising a framework having a first side and a second side; and a plurality of projections on at least one of the first side or the second side, wherein at least one of the projections comprises a neck and a head, wherein the neck extends from the framework to the head, and wherein a portion of the head extends outwardly from the neck to form an overhang. In certain embodiments, the at least one projection comprises a semispherical-head. In particular embodiments, the semispherical-head comprises a top point and a side point connected by a dome therebetween. In certain embodiments, the at least one projection comprises a cross-head. In particular embodiments, the cross-head comprises a top point and four side points wherein the side points extend a distance away from the neck to overhang the neck. In certain embodiments, the projections are on both the first side and the second side. In certain embodiments, the framework comprises a metal. In particular embodiments, the framework comprises steel. In certain embodiments, the at least one projection comprises steel.

Further provided is a connector comprising a metal framework having a first side and a second side; and a plurality of arrow-shaped projections extending from at least one of the first side or the second side, wherein at least one of the arrow-shaped projections comprises a neck and a head, wherein the neck extends from the framework to the head, and wherein the head has a first side point that extends outwardly from the neck to define a first overhang and a second side point that extends outwardly from the neck to define a second overhang. In certain embodiments, the metal framework further comprises arrow-shaped openings. In certain embodiments, the first overhang and the second overhang are orthogonal to the neck. In certain embodiments, the plurality of projections extend in different directions relative to the framework.

Further provided is a connector comprising a framework having a first side and a second side; and an array of self-driven screws on the framework, wherein at least one of the self-driven screws comprises a first threaded portion and a second threaded portion, the first threaded portion extending from the first side and the second threaded portion extending from the second side, wherein the first threaded portion and the second threaded portion meet in a bracket and are capable of rotating within the bracket. In certain embodiments, the first threaded portion has a first pitch, and the second threaded portion has a second pitch, wherein the first pitch and the second pitch are different. In particular embodiments, the first pitch changes along a length of the first threaded portion, or the second pitch changes along a length of the second threaded portion. In certain embodiments, the bracket is within a plane defined by the framework. In certain embodiments, the first threaded portion and the second threaded portion are threaded in opposing directions. In certain embodiments, the framework is a solid, continuous sheet. In certain embodiments, the framework is grated.

BRIEF DESCRIPTION OF THE DRAWINGS

The patent or application file may contain one or more drawings executed in color and/or one or more photographs. Copies of this patent or patent application publication with color drawing(s) and/or photograph(s) will be provided by the U.S. Patent and Trademark Office upon request and payment of the necessary fees.

DETAILED DESCRIPTION

Throughout this disclosure, various publications, patents, and published patent specifications are referenced by an identifying citation. The disclosures of these publications, patents, and published patent specifications are hereby incorporated by reference into the present disclosure in their entirety to more fully describe the state of the art to which this invention pertains.

Figure 1:
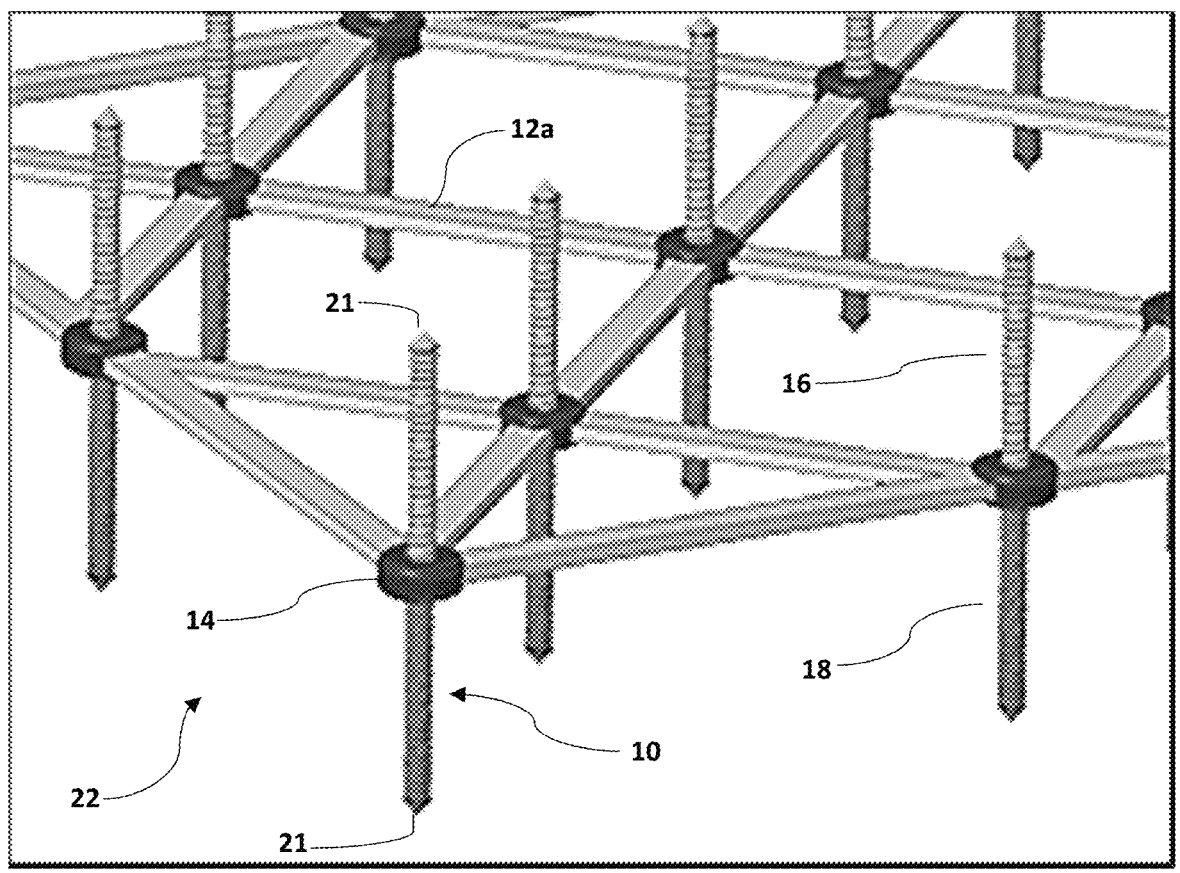
FIG. 1 is a top front perspective view of an array of self-driven screws arranged on a framework.
Figure 2:
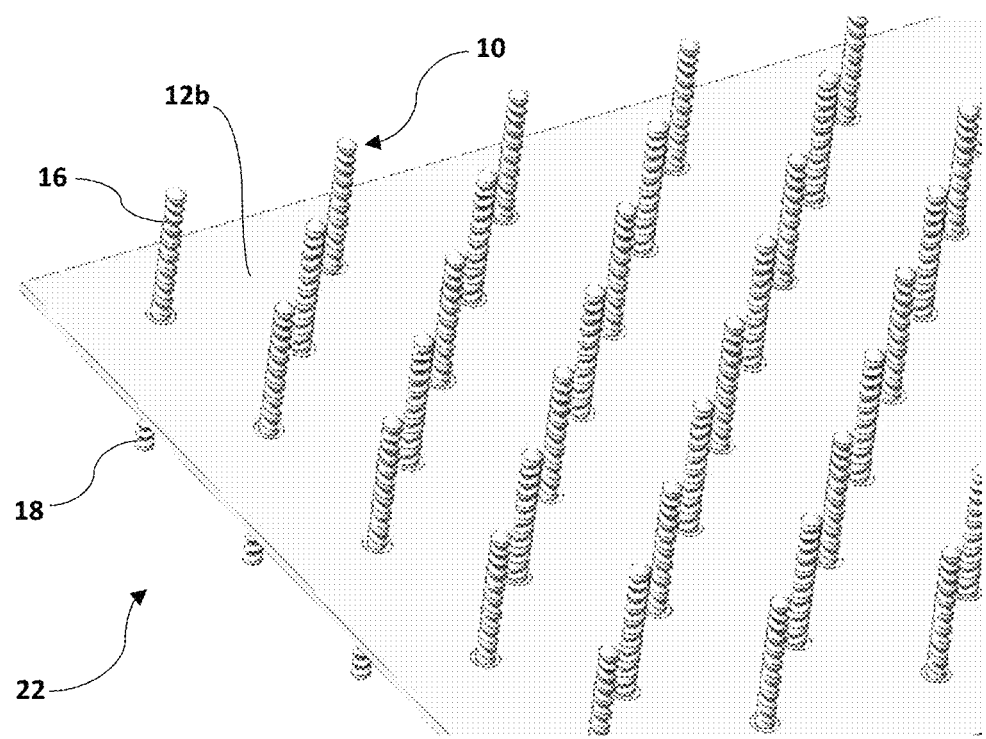
FIG. 2 is a top front perspective view of an array of self-driven screws arranged on a framework comprising a sheet.
Figure 3:
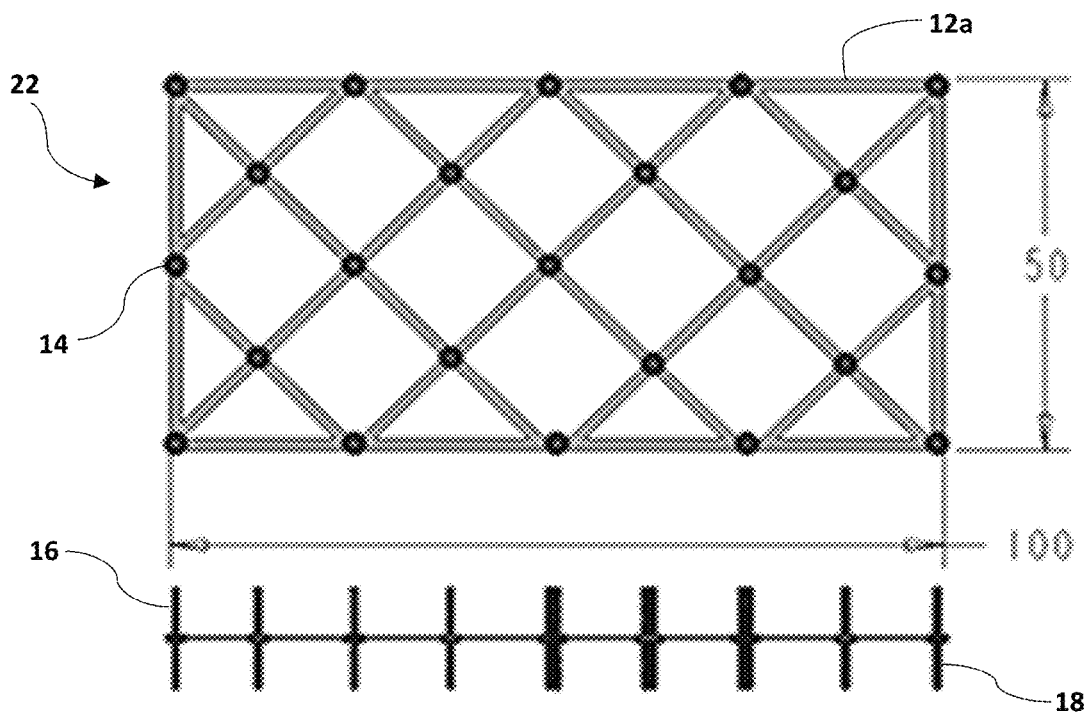
FIG. 3 shows orthogonal top and side views of the array of self-driven screws arranged on a framework. Non-limiting example dimensions are shown.

Provided herein are connectors for connecting metal sheets, such as aluminum sheets. Referring now to the drawings, there is illustrated in FIGS. 1-5 a first embodiment of a connector 22 in which an array of self-driven screws 10 is arranged on a framework 12. The self-driven screws 10 can be arranged on a grated framework 12a, as depicted in FIG. 1, or on a solid, continuous sheet 12b, as depicted in FIG. 2. The framework 12 may be composed of steel. The framework 12 can assume a variety of shapes and patterns. For example, the framework 12 may have a rectangular shape, as seen in FIG. 3, but is not limited to any particular design or shape.

Referring now to FIG. 3, a top view and a side view are shown of an array of self-driven screws 10 arranged on a rectangular framework 12a. The rectangular framework 12a may have dimensions comprising a width of 50 and a length of 100 with an internal grated structure comprising a rectangular pattern. However, the framework 12a may assume a variety of shapes with a variety of internal grating orientations particularly those most favorable for joining metal sheets. FIG. 3 also shows the self-driven screws 10 arranged at points of intersection on the grated framework 12a. However, the self-driven screws 10 may be arranged in any manner suitable to connecting sheets of metal at a joint.

The self-driven screws 10 can be arranged on the framework 12a in a variety of patterns. As can be seen in FIG. 3, for example, the self-driven screws 10 may be arranged on a rectangular shaped framework 12b measuring 50×100, and may be evenly spaced apart. However, this is not limited to a particular shape of framework 12 or pattern of self-driven screws 10. In the side view in FIG. 3, it can be seen that the self-driven screws 10 extend above and below the framework 12a. In other words, the framework 12a has a first side and a second side, and defines a plane between the first side and the second side. The self-driven screws 10 may extend away from the plane on the first side and may extend away from the plane on the second side.

Figure 4:
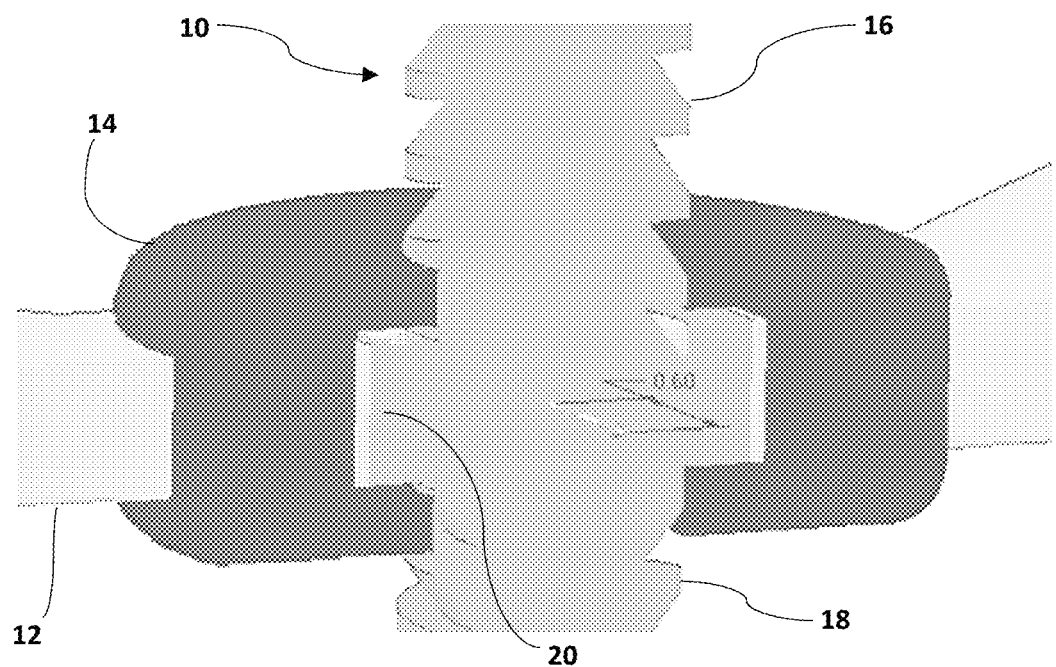
FIG. 4 is side cutaway view of a section of a self-driven screw.

Referring to FIG. 4, a cut away view depicts a self-driven screw 10 attached to the framework 12. As shown in FIG. 4, each self-driven screw 10 may be locked in a bracket 14 in which the self-driven screw 10 is free to rotate. The self-driven screw 10 has a top portion 16 composed of a first threaded portion, which extends above the bracket 14 relative to the framework 12, and a bottom portion 18 composed of a second threaded portion, which extends below the bracket 14 relative to the framework 12. In some embodiments, the bracket 14 is in a plane defined by the framework 12.

Figure 5:
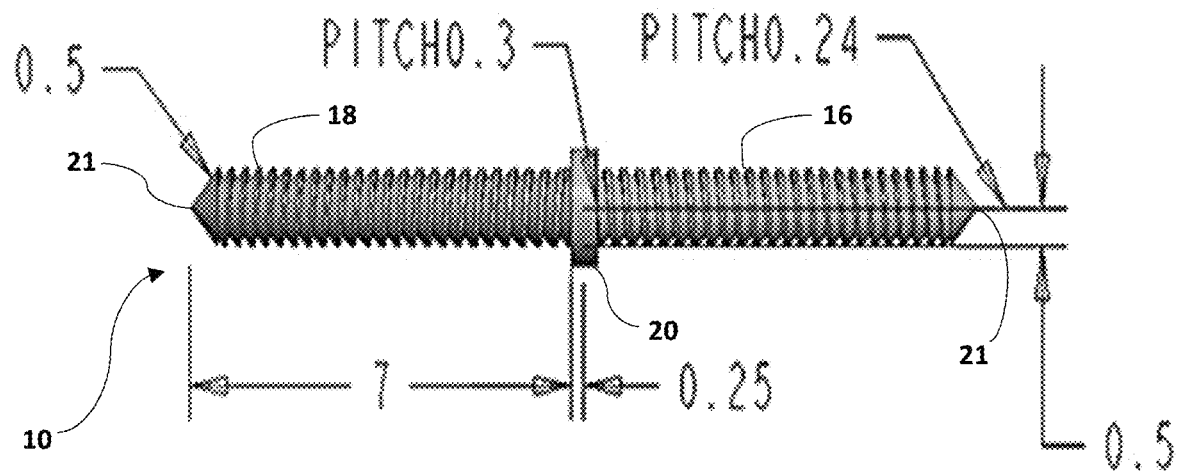
FIG. 5 is a sectional view of a self-driven screw. Non-limiting example dimensions and pitch sizes are shown.

Non-limiting examples of the threads and pitches of the self-driven screws 10 are illustrated in FIG. 5. Referring now to FIG. 5, a side view of an embodiment of the self-driven screw 10 is shown. The self-driven screw 10 has a top portion 16, a center mount 20, and a bottom portion 18. The top portion 16 (i.e, first threaded portion) and the bottom portion 18 (i.e., second threaded portion) may be threaded in opposing directions. In the embodiment illustrated in FIG. 5, for example, the top portion 16 is threaded in a right-handed direction and the bottom portion 18 is threaded in a left-handed direction. Furthermore, the pitch of the top portion 16 may change along the length of the first threaded portion 16, and the pitch of the bottom portion 18 may change along the length of the second threaded portion 18. In the non-limiting example depicted in FIG. 5, for example, the pitch of the first threaded portion 16 is smaller at the tip 21, measuring 0.24, and increases in the direction of the center mount 20, measuring 0.3 adjacent to the center mount 20. The first threaded portion 16 may have a first pitch, and the second threaded portion 18 may have a second pitch, and the first pitch and the second pitch may be different. In addition, the length and thickness of the top portion 16 of the self-driven screw 10 may be different from the length and thickness of the bottom portion 18 of the self-driven screw 10.

An assembly of self-driven screws 10, the framework 12, and brackets 14 may be called a connector 22, as seen for example in FIGS. 1-3. A connector 22 can be used to join metal plates 24 together instead of employing a traditional weld. To join metal plates 24 together, such as aluminum sheets, the connector 22 is first placed between the plates 24. Then, the plates 24 may be compressed. Because the self-driven screws 10 are threaded left-handed on one side and threaded right-handed on the other side, torques from the squeezing metals (aluminum) push the self-driven screws 10 to rotate in the same direction, and penetrate into the plates 24. The self-driven screws 10 rotate under the torque exerted by squeezing from the plates 24, and embed themselves into the plates 24, forming a joint between the plates 24. The self-driven screw array connectors 22 are especially useful for joining thick plates 24, and they are loosening-resistant.

Figure 6:
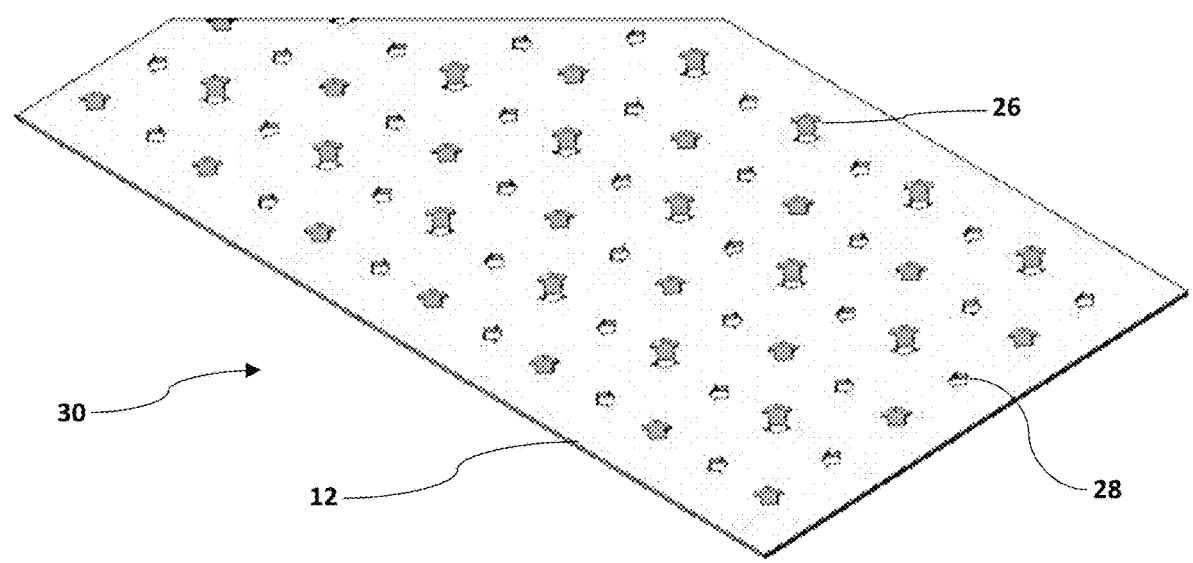
FIG. 6 is a top front perspective view of a connector plate having an array of punched arrow-head protrusions.
Figure 7:
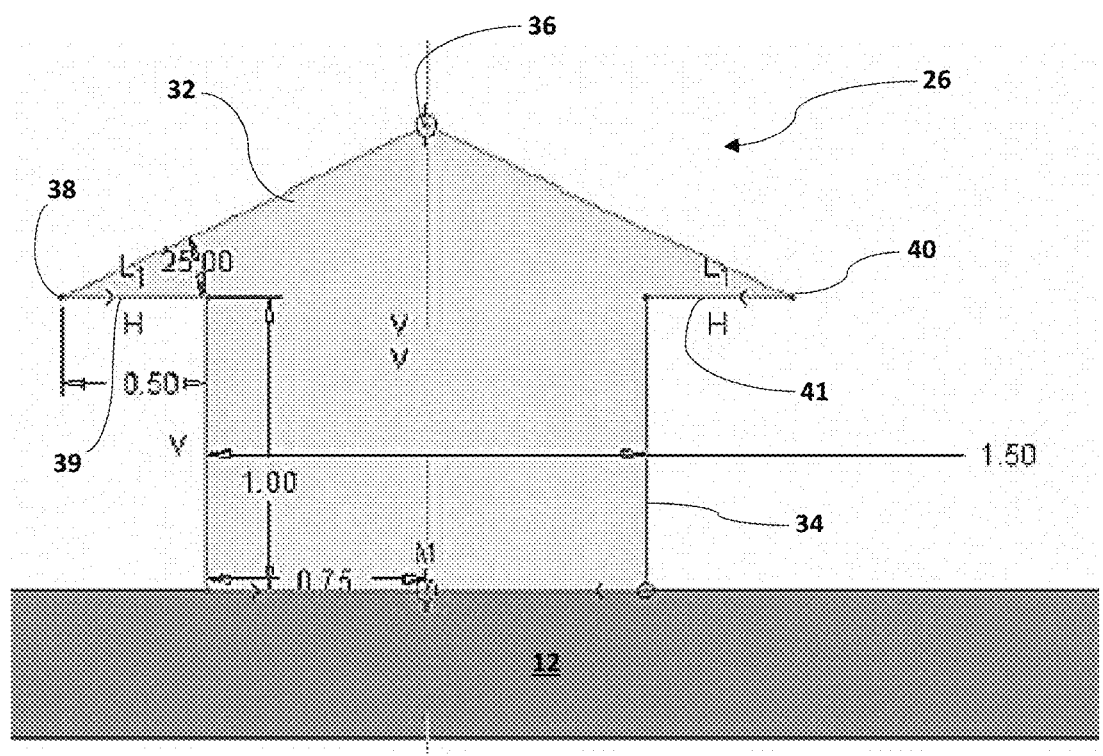
FIG. 7 is a side view of an arrow-head protrusion. Non-limiting example dimensions are shown.
Figure 8:
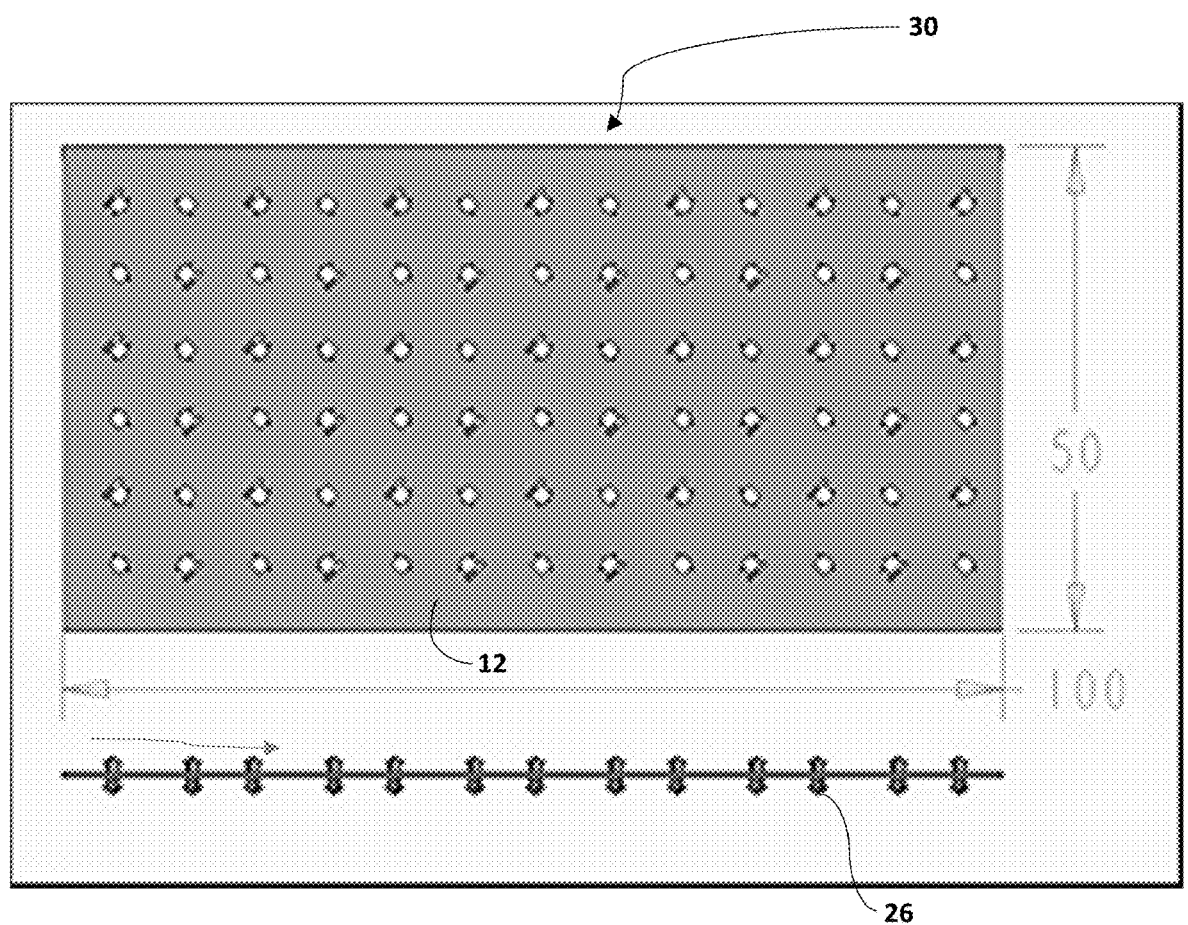
FIG. 8 shows a top and side view of an array of arrow-head protrusions. Non-limiting example dimensions are shown.

Referring now to FIGS. 6-8, there is a perspective view of a second embodiment of a connector 30 in which an array of punched protrusions 26 are arranged on a framework 12, for example, a metal sheet. The metal sheet may be composed of a metal or metal alloy such as steel. The array of punched protrusions 26 may be placed on only one side of the framework 12 (i.e., one-sided array of punched protrusions) or on both sides of the framework 12 (i.e., two-sided array of punched protrusions) as shown in FIG. 6. The one-sided array of punched protrusions 26 may be placed at the side of two metal plates 24 to form a joint between the two metal plates 24, and the two-sided array of punched protrusions 26 may be placed between two metal plates 24 to form a joint between the two metal plates 24.

The array may be an array of punched arrow projections 26 on a framework 12 such as a metal sheet. These arrow projections 26 may be created by punching a sheet 12 from one side to the other side, creating arrow-shaped projections 26 and arrow-shaped openings 28. The arrow-shaped projections 26 can be arranged so that half of the projections 26 are pointing to one side relative to the framework 12, and half of the projections 26 are pointing to another side relative to the framework 12. However, it is not necessary for the number of projections 26 on one side of the framework 12 to equal the number of projections 26 on the other side of the framework 12. Example connectors 30 with punched arrow projections 26 on a sheet for joining aluminum plates 24 can be seen in FIGS. 6, 8.

Details of a non-limiting example of the punched arrow projections 26 are shown in FIG. 7. Referring to FIG. 7, an arrow projection 26 may include a head 32 defining an arrow shape, and an elongated neck 34 extending between the framework 12 and the head 32. The head 32 may include a tip 36, a first side point 38, and a second side point 40, where the tip 36 is between the first side point 38 and the second side point 40. The first side point 38 may extend outwardly from the elongated neck 34 to create a first overhang 39, and the second side point 40 may extend outwardly from the elongated neck 34 to create a second overhang 41. The first overhang 39 and the second overhang 41 may each be orthogonal to the elongated neck 34, but the sizes of the first overhang 39 and the second overhang 41 may be different if using an asymmetrically shaped arrow head. A framework 12 having an array of arrow projections 26 may be referred to as a connector 30.

When placed between two aluminum plates 24 which are compressed against each other, the projections 26 may be pressed into the plates 24, forming a joint between the plates 24. A connector 30 having the projections 26 may also be used to join two pieces of metals sheets/plates/bulk 24 from only one side instead of two. When joining two aluminum sheets 24 together, a connector 30 may be placed between the sheets 24 first, and then the two sheets 24 may be pressed together from both sides. The projections 26 may penetrate into the sheets 24, and the heads 32 of the arrow projections 26 may form interlocks with the sheet material, forming a joint between the sheets 24.

The arrow projections 26 can be made pointing to the same side, and such a connector 30 can be used to link two pieces of aluminum (not necessarily sheets or plates) from one side. The shape of such connectors 30 may conform to that of the joint, by applying a compressive load through a preformed punch.

Figure 9:
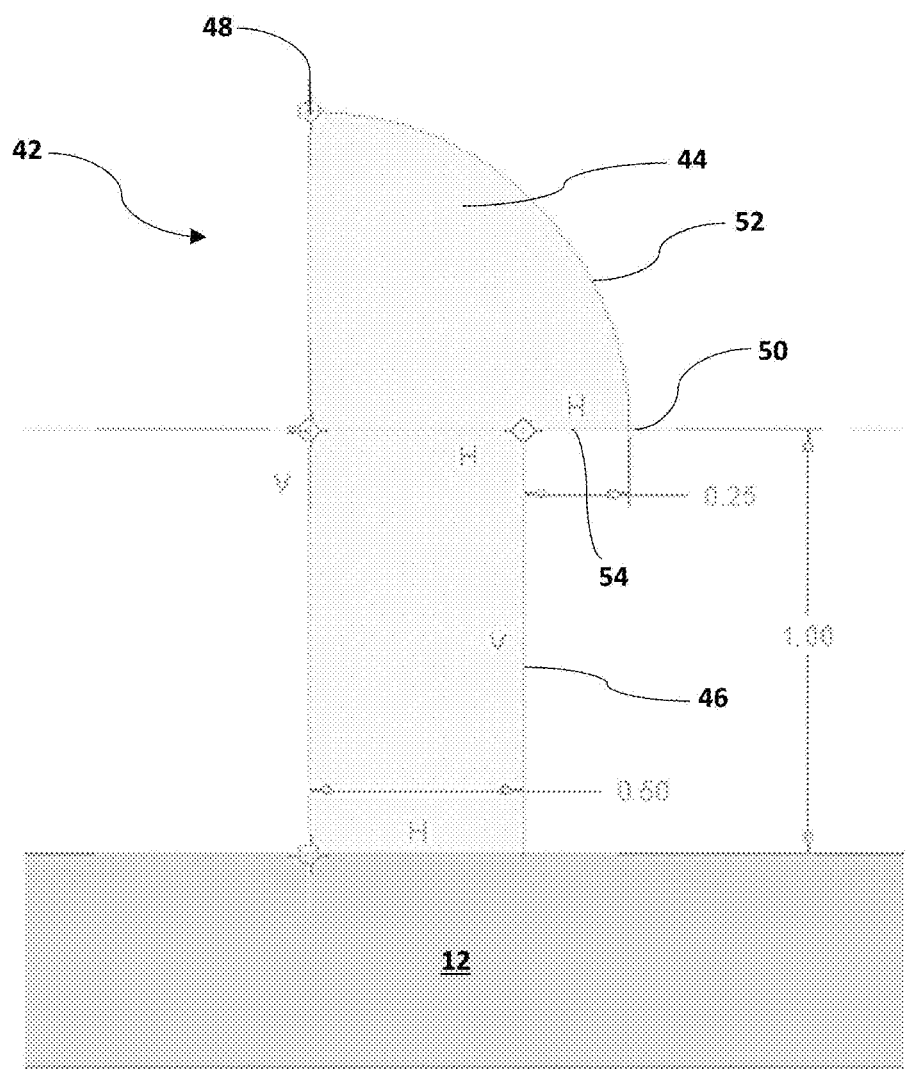
FIG. 9 is a side view of a semispherical-head protrusion. Non-limiting example dimensions are shown.
Figure 10:
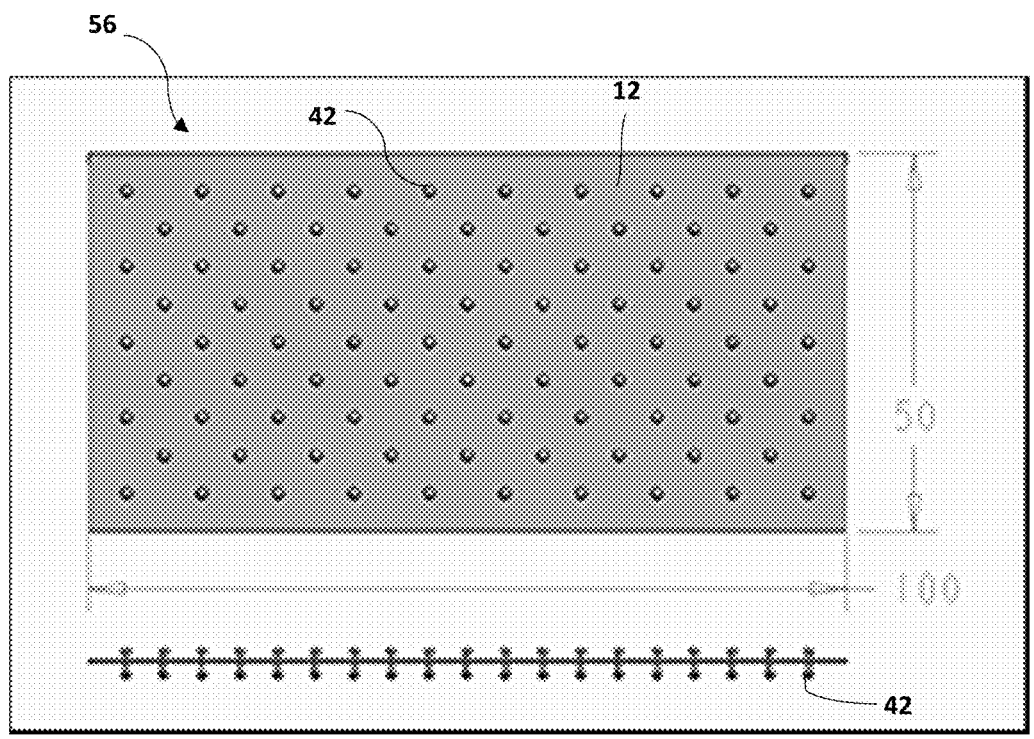
FIG. 10 is an isometric view of an array of a sheet of semispherical-head protrusions. Non-limiting example dimensions are shown.
Figure 11:
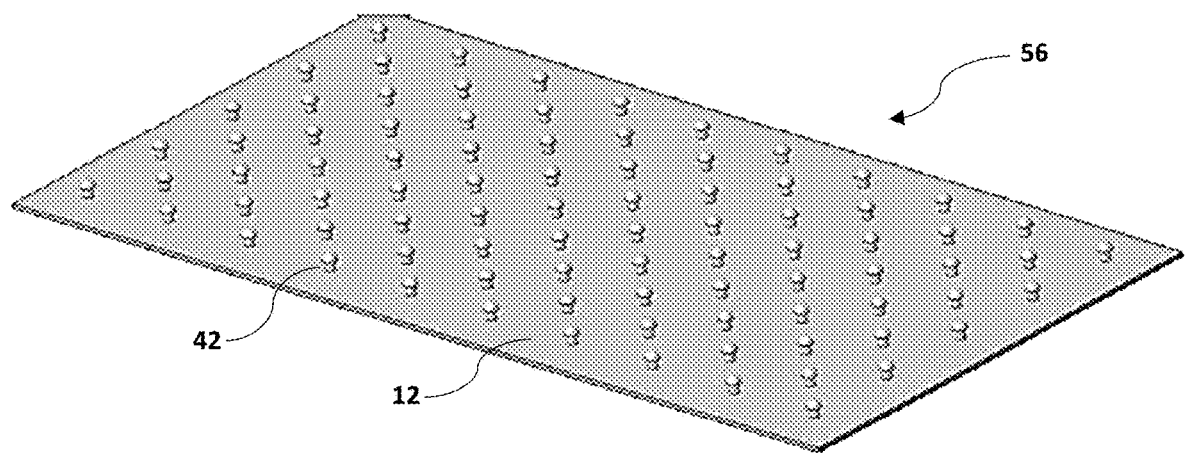
FIG. 11 is an isometric view of an array of a sheet of semispherical-head protrusions.

FIGS. 9-11 show a third embodiment of a connector 56, in which arrays of forged semispherical-head protrusions 42 are arranged on a framework 12 and placed either on one side of, or between, two sheets or plates 24. If the semispherical-head protrusions 42 are on both sides of the framework 12, the semispherical-head protrusions 42 may be aligned, but do not have to be. In some embodiments, an array of solid steel rivet-shaped projections 42 may be provided on a steel sheet 12. When placed between two metal (aluminum) plates or sheets 24 which are compressed against each other, the projections 42 may be pressed into the plates or sheets 24, forming a joint between the plates or sheets 24. The projections 42 may be attached to the sheets 24 from both sides, with pairs of projections 42 aligned.

The details of a non-limiting example semispherical-head projection 42 can be seen in FIG. 9. Referring to FIG. 9, a semispherical-head projection 42 may include a semispherical head 44 and an elongated neck 46 extending from the framework 12 to the semispherical head 44. As seen in FIG. 9, the cross-section of a semispherical head 44 may include a top point 48 and a side point 50 connected by a dome 52 therebetween. The side point 50 may extend outwardly from the elongated neck 46 to create an overhang 54. A framework 12 having an array of semispherical-head projections 42 may be referred to as a connector 56.

When joining two aluminum sheets together, a connector 56 may be placed between the sheets 24 first. Then, the sheets 24 may be pressed from both sides. The projections 42 may penetrate into the sheets 24, and the heads 44 of the projections 42 may form interlocks with the sheet material, forming a joint between the sheets 24. In other embodiments, the projections 42 may be arranged on one side of the framework 12 only. The connector 56 may be placed on two (or more) sheets 24 of aluminum or other metal from the same side, and compressed into the metal pieces, forming a joint between the sheets 24 from one side. The shape of such connectors 56 may conform to that of the joint, by applying a compressive load through a preformed punch. The projections 42, with the support of the plate 24, may pierce the aluminum sheets 24 and hold them together.

FIGS. 12-15 show a fourth embodiment of a connector 70, in which an array of cross-head projections 58 on a framework 12 is used for joining aluminum plates or sheets 24. The projections 58 can be sharp and may be placed either on one side or between two sheets or plates 24.

Figure 12:
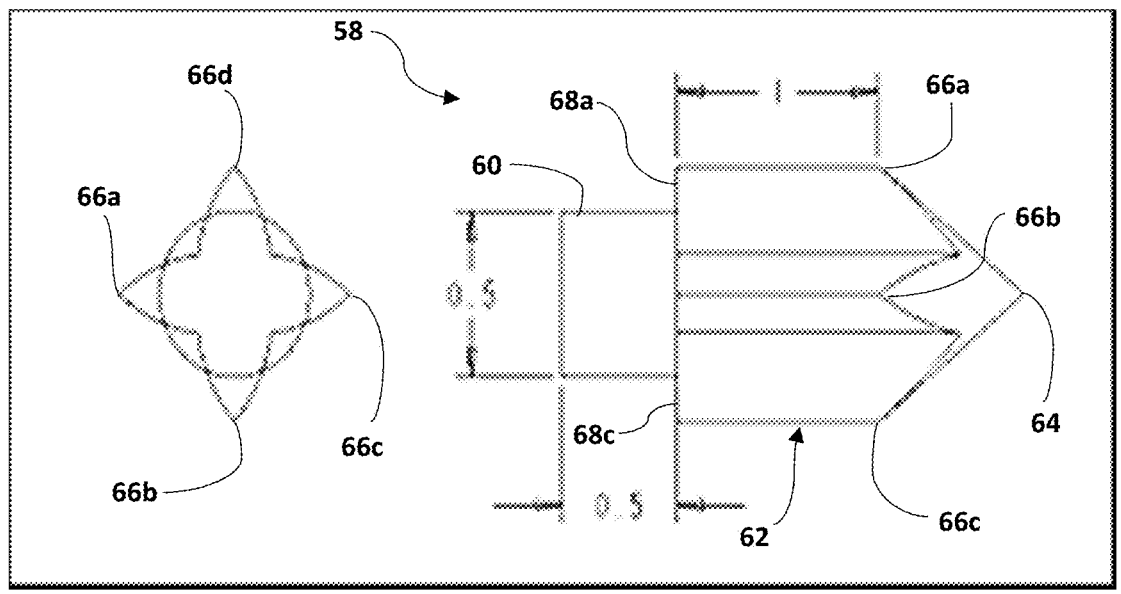
FIG. 12 is an illustration of a cross-head projection. Non-limiting example dimensions are shown.
Figure 13:
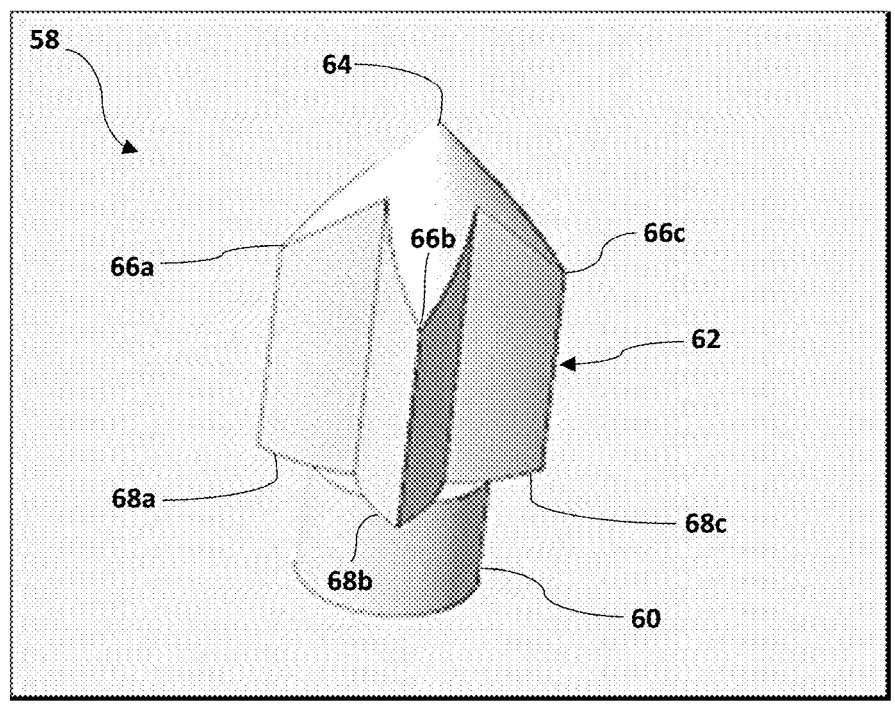
FIG. 13 is an isometric view of a cross-head projection.

FIGS. 12-13 depict details of a non-limiting example of a cross-head projection 58. Referring to FIGS. 12-13, a cross-head projection 58 may include a circular neck 60 extending from the framework 12 to a crosshead 62. The crosshead 62 may include a top point 64 and four side points 66a, 66b, 66c, 66d. Each of the side points 66a, 66b, 66c, 66d may extend some distance away from the neck 60 so as to create an overhang 68a, 68b, 68c, 68d. A framework 12 with an array of cross-head projections 58 on a framework 12 may be referred to as a connector 70.

Figure 14:
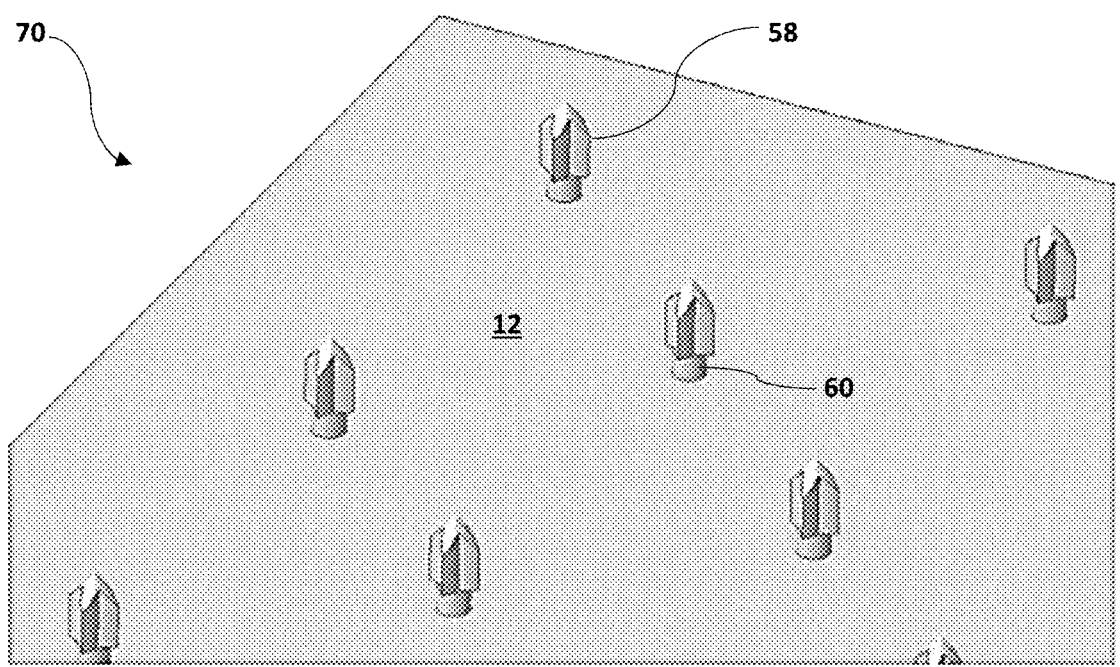
FIG. 14 is an isometric view of a connector plate having an array of cross-head projections.
Figure 15:
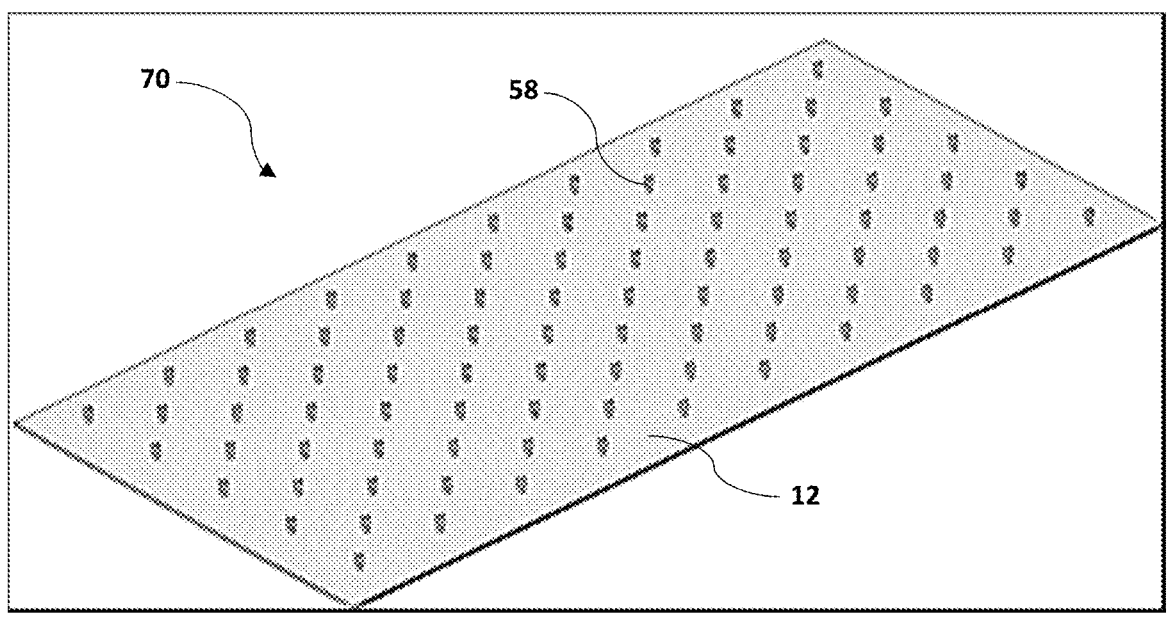
FIG. 15 is an isometric view of a connector plate having an array of cross-head projections.

An array of solid cross-head projections 58 arranged on a sheet 12 can be seen in FIG. 14. These projections 58 may be attached to the sheets 12 from both sides, with pairs of projections 58 aligned. When joining two aluminum sheets or plates 24 together, such a connector 70 may be placed between the sheets 24 first. Then, the sheets 24 may be pressed from both sides. The projections 58 may penetrate into the sheets 24, and the heads of the projections 58 may form interlocks with the sheet material, forming a joint between the sheets 24. A connector 70 may also be made with projections 58 arranged on only one side of the framework 12, and may be placed on two (or more) sheets 24 of aluminum from the same side, and compressed into the aluminum sheets 24, forming a joint from one side. The shape of such connectors 70 may conform to that of the joint, by applying a compressive load through a preformed punch. If a framework 12 is two-sided, the projections 58 may be aligned on both sides. However, it is not necessary for the projections 58 to be aligned on both sides. The projections 58, with the support of the framework 12, may pierce the aluminum sheets/plates 24 and hold them together.

In general, the connectors 22, 30, 56, 70 have advantages over known metal joining materials, and the use of connectors 22, 30, 56, 70 to join metals has advantages over known methods for joining metals. First, the connectors 22, 30, 56, 70 can be configured to fit the particular shape/curvature of the joints. Second, the processes for using the connectors 22, 30, 56, 70 may not require complex fixtures, tool alignment, a die, or any sophisticated equipment, and may not produce any harmful gases, fumes, or byproducts. Third, the shape, size of the projections/protrusions 26, 42, 58 or screws 10, and their arrangements, can be altered to meet the joining needs. Fourth, a strong mechanical interlocking may be created by the connectors 22, 30, 56, 70 and maintained in service. Fifth, stress concentration may be lowered and the joint's strength may be raised. Other advantages may be apparent to those skilled in the art.

EXAMPLES

Finite element simulations were conducted to evaluate stress distribution under tensile loading. These simulations demonstrate that the connectors described herein may lower stress concentration.

Figure 16:
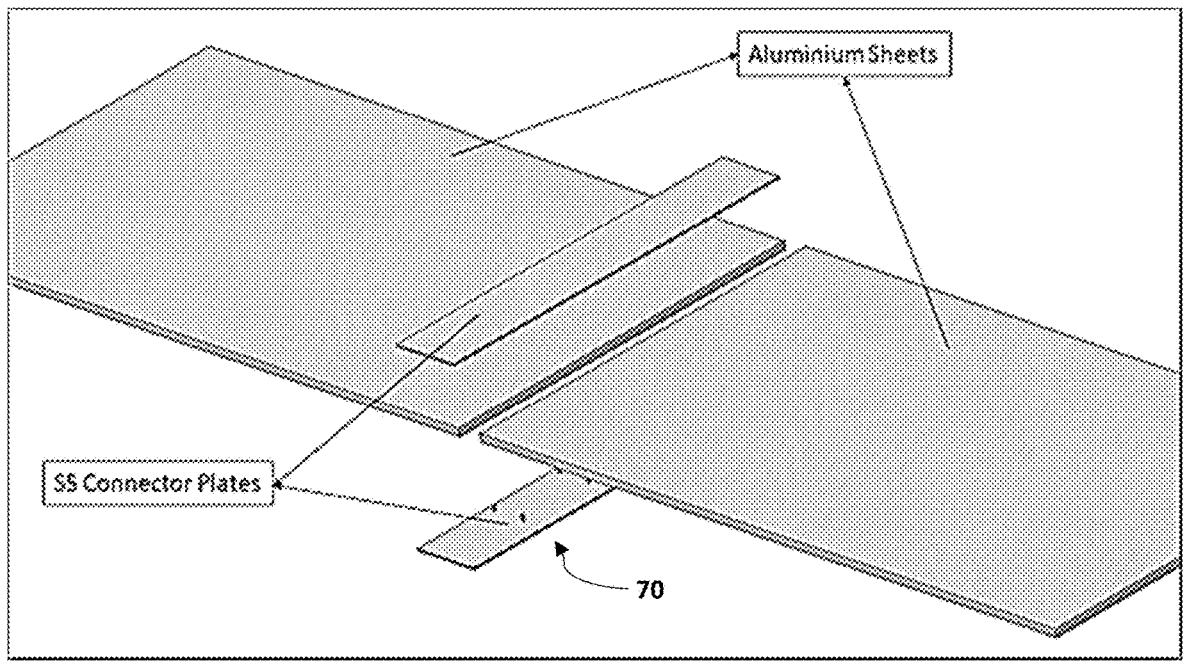
FIG. 16 is an illustration of a joint assembly having two connector plates each with two rows of projections for connecting aluminum sheets.
Figure 17:
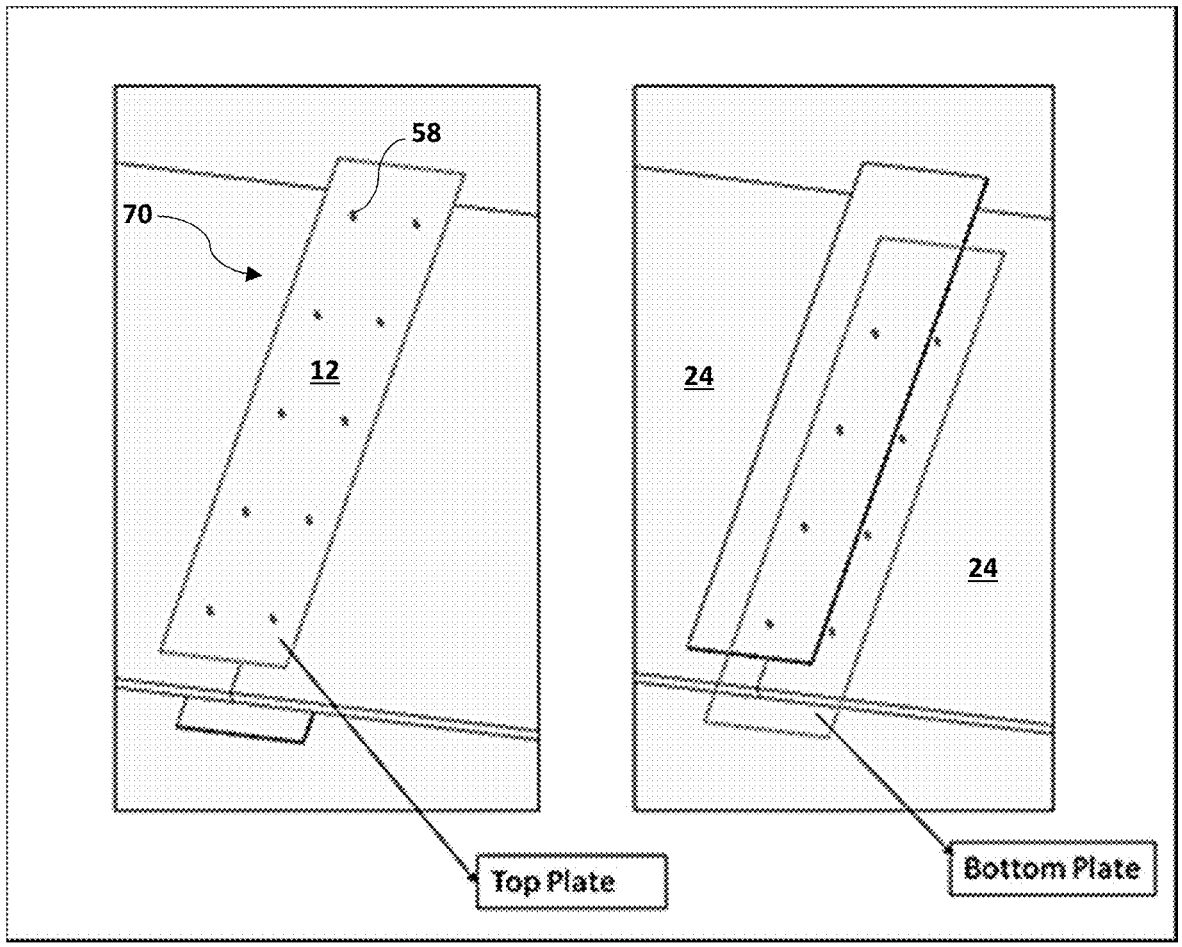
FIG. 17 is an illustration of a joint assembly having two connector plates, a top plate and a bottom plate. The image on the left shows the top plate in green, and the image on the right shows the bottom plate in green.

FIG. 16 shows a finite element simulation of joints made using arrays of forged distributed cross-head projections. The connector plates are made of stainless steel (SS) and are composed of two rows of protrusions to secure two aluminum sheets at a joint, as shown in FIG. 17.

Figure 18A:
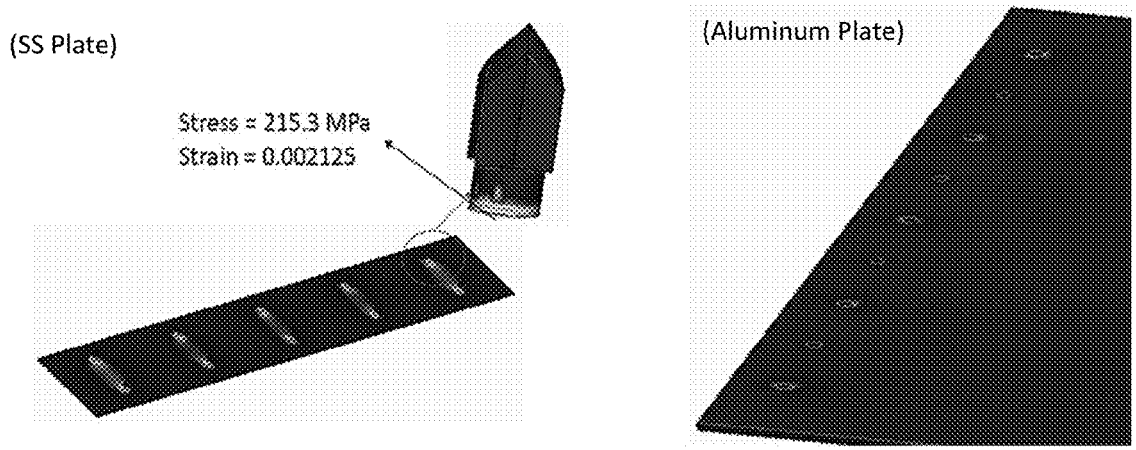
FIGS. 18A-18C show the results of stress testing for a joint assembly with two rows of cross-head projections.
Figure 18B:
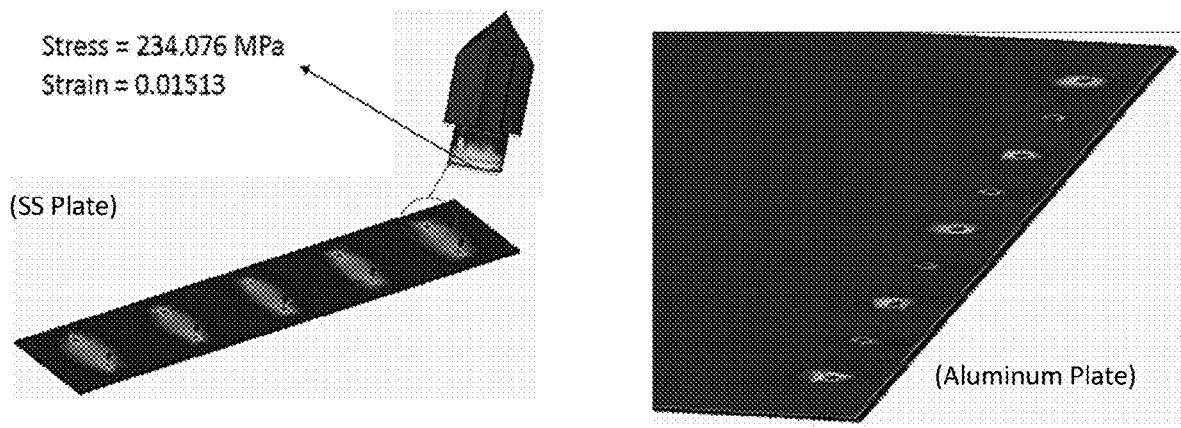
Figure 18C:
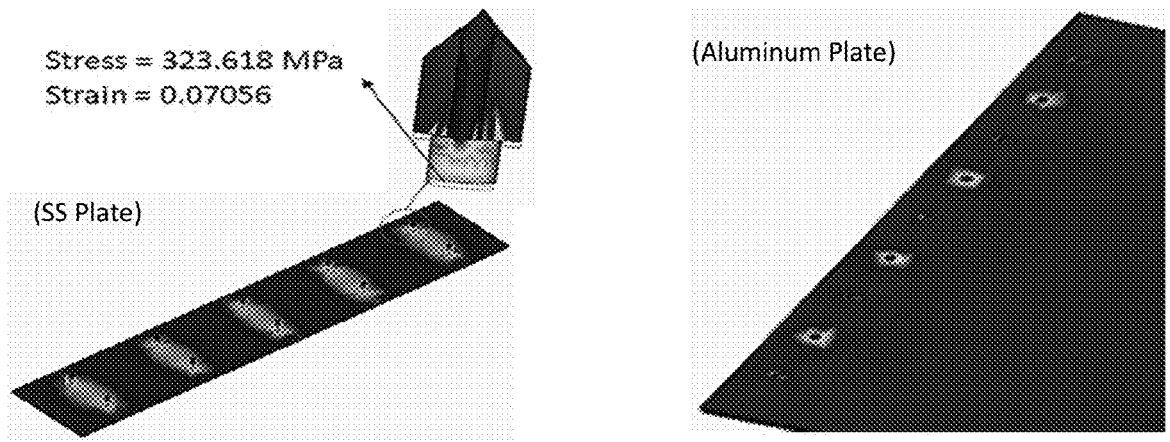

FIGS. 18A-18C show the von Mises stress distribution under tensile loading. In FIG. 18A, at 1 kN force, the stress is 215.3 MPa and the strain is 0.002125. In FIG. 18B, at 2 kN force, the stress is 234.076 MPa and the strain is 0.01513. In FIG. 18C, at 3 kN force, the stress is 323.618 MPa and the strain is 0.07056.

Figure 19A:
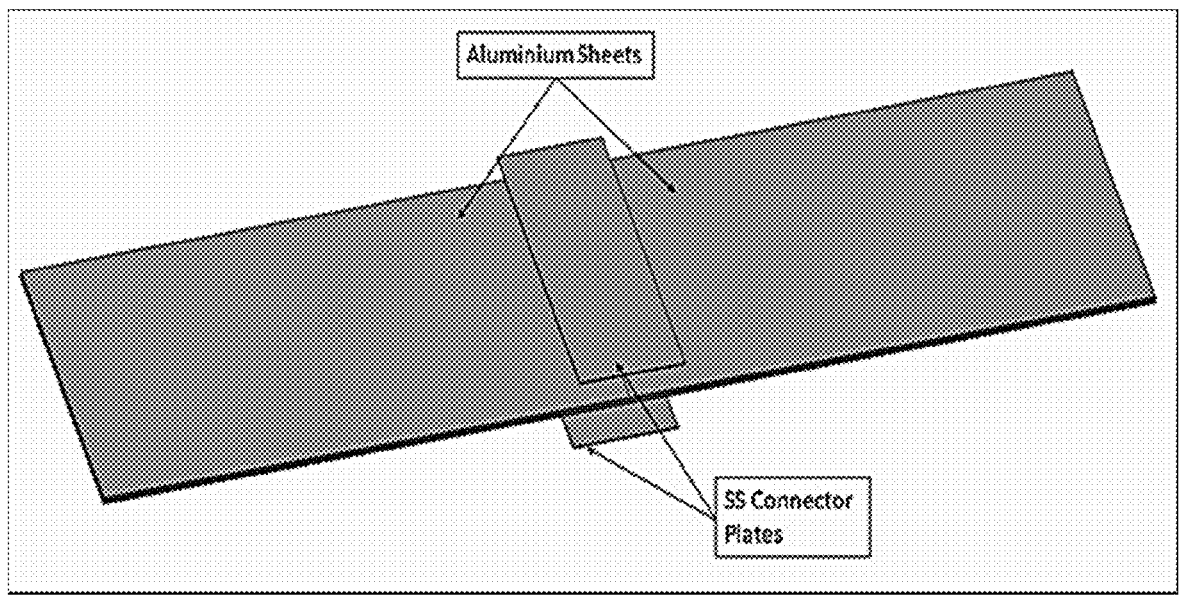
FIGS. 19A-19B show a finite element simulation of joints made using arrays of forged distributed cross-head projections. The connector plates are made of stainless steel (SS) and are composed of four rows of protrusions to secure two aluminum sheets at a joint, as shown in green in FIG. 19B.
Figure 19B:
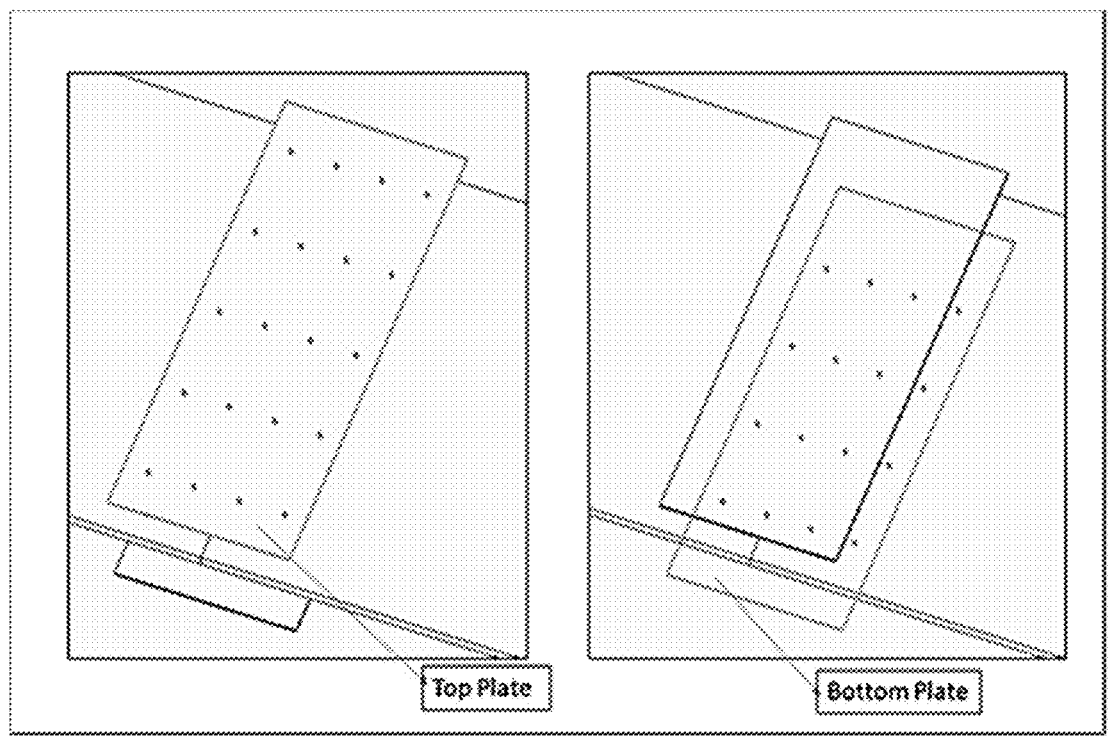

FIG. 19A shows a finite element simulation of joints made using arrays of forged distributed cross-head projections. The connector plates are made of stainless steel (SS) and consist of four rows of projections to secure two aluminum sheets at a joint, as shown in FIG. 19B.

Figure 20A:
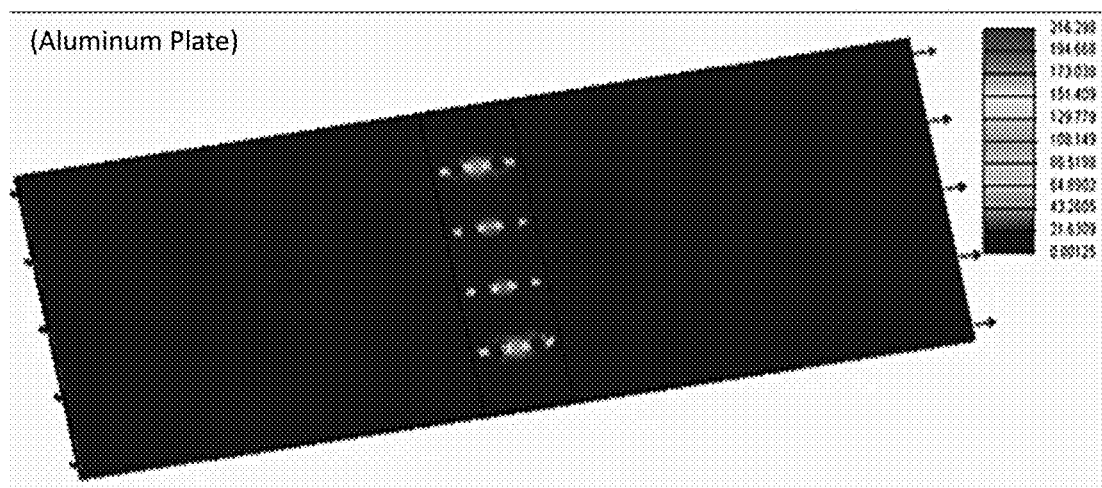
FIGS. 20A-20F show the results of stress testing for a joint assembly with four rows of cross-head projections.
Figure 20A:
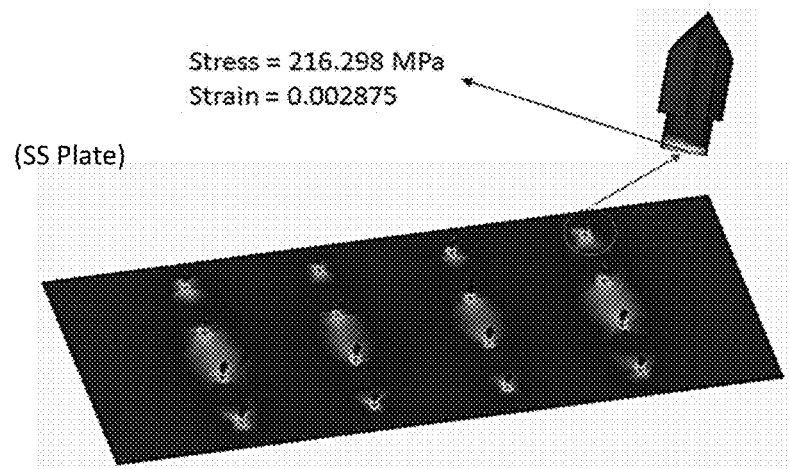
Figure 20B:
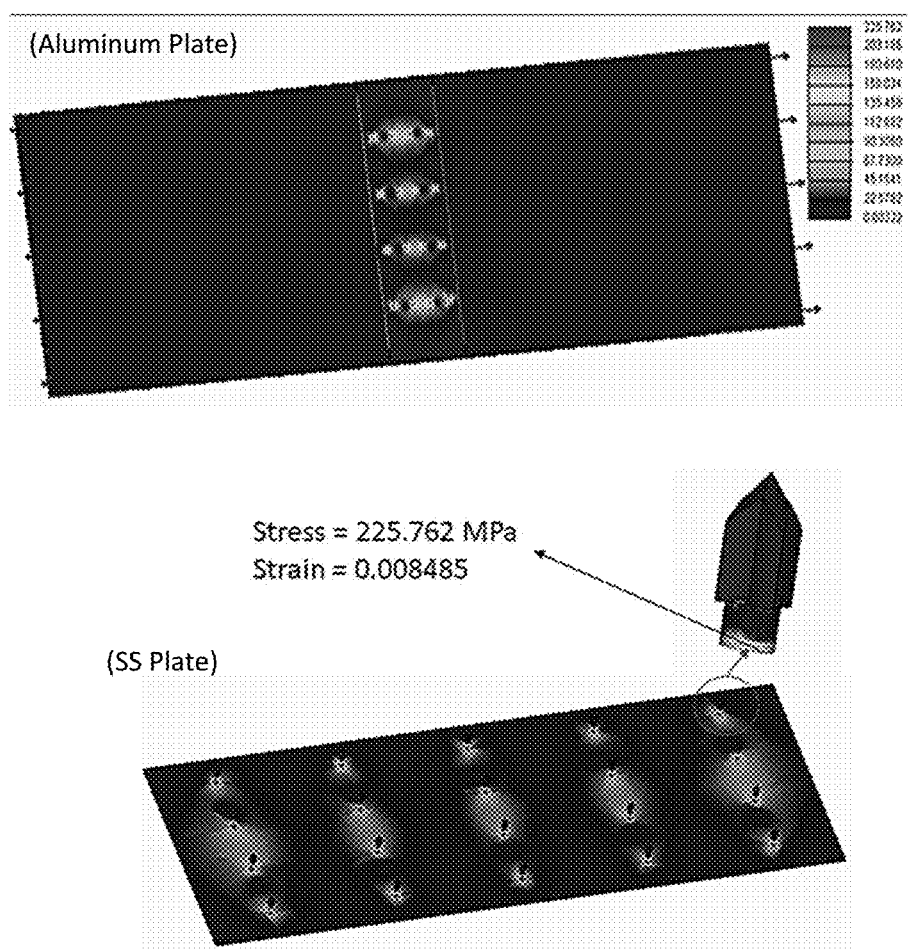
Figure 20C:
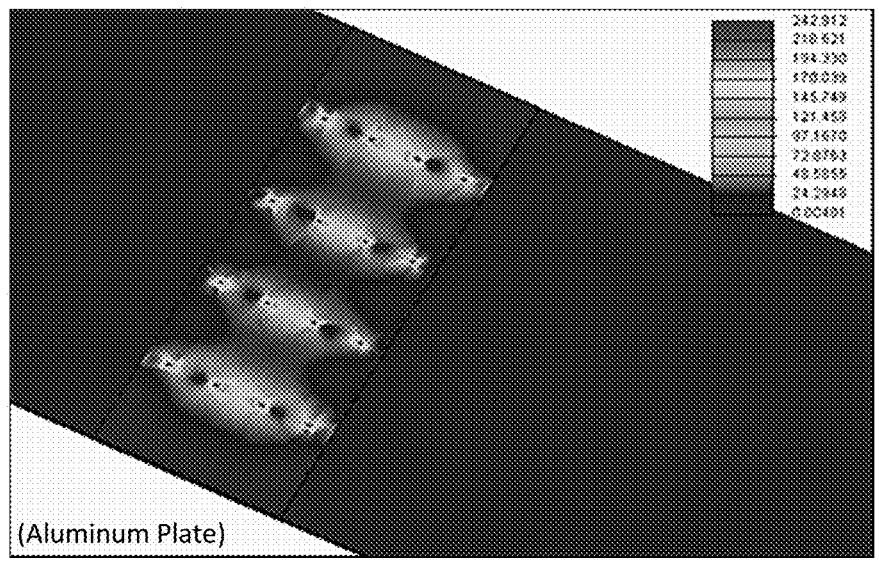
Figure 20C:
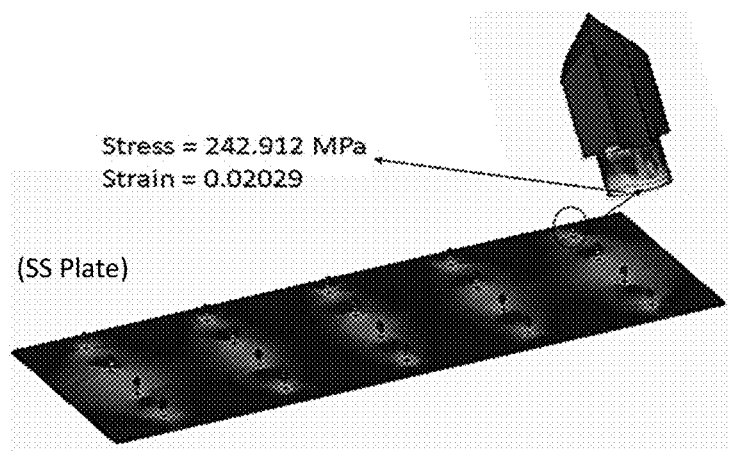
Figure 20D:
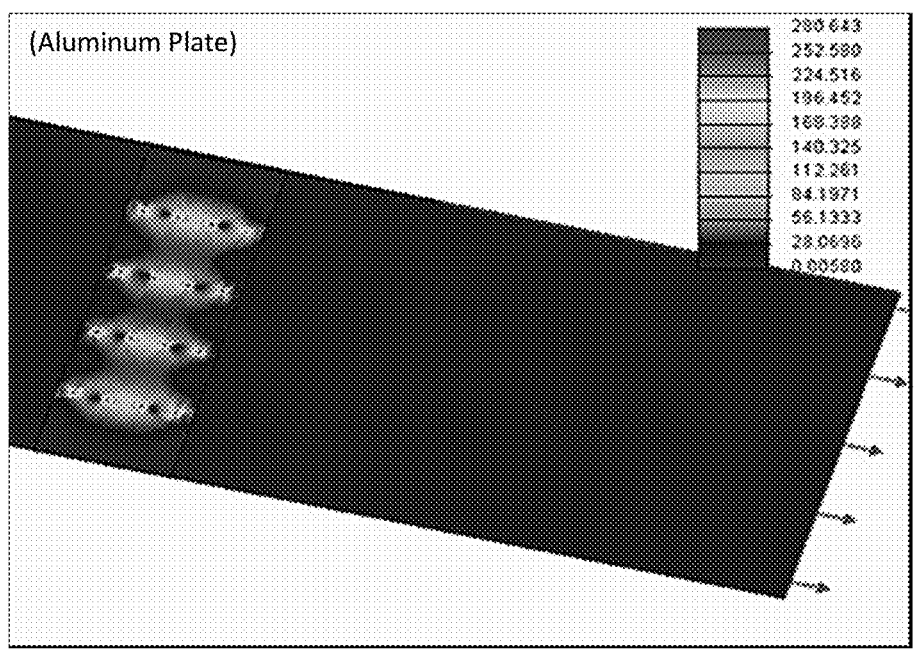
Figure 20D:
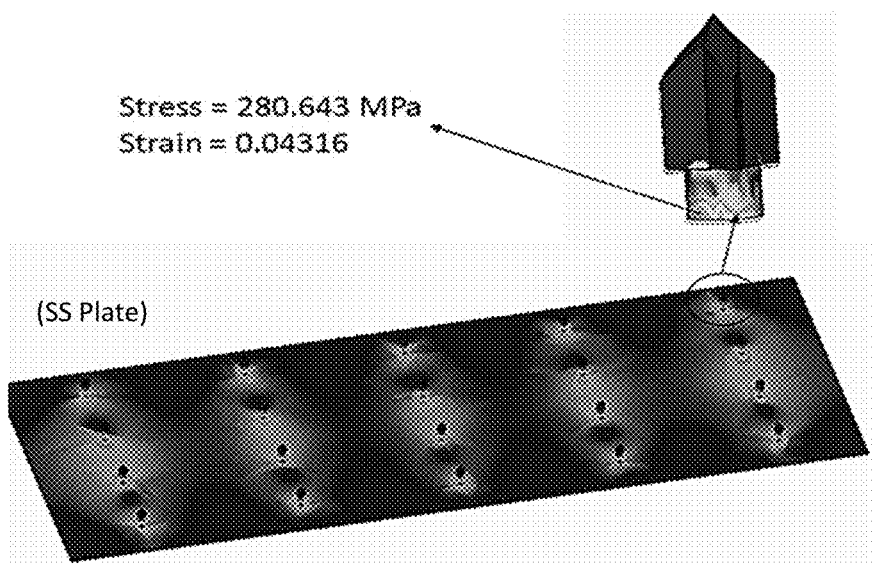
Figure 20E:
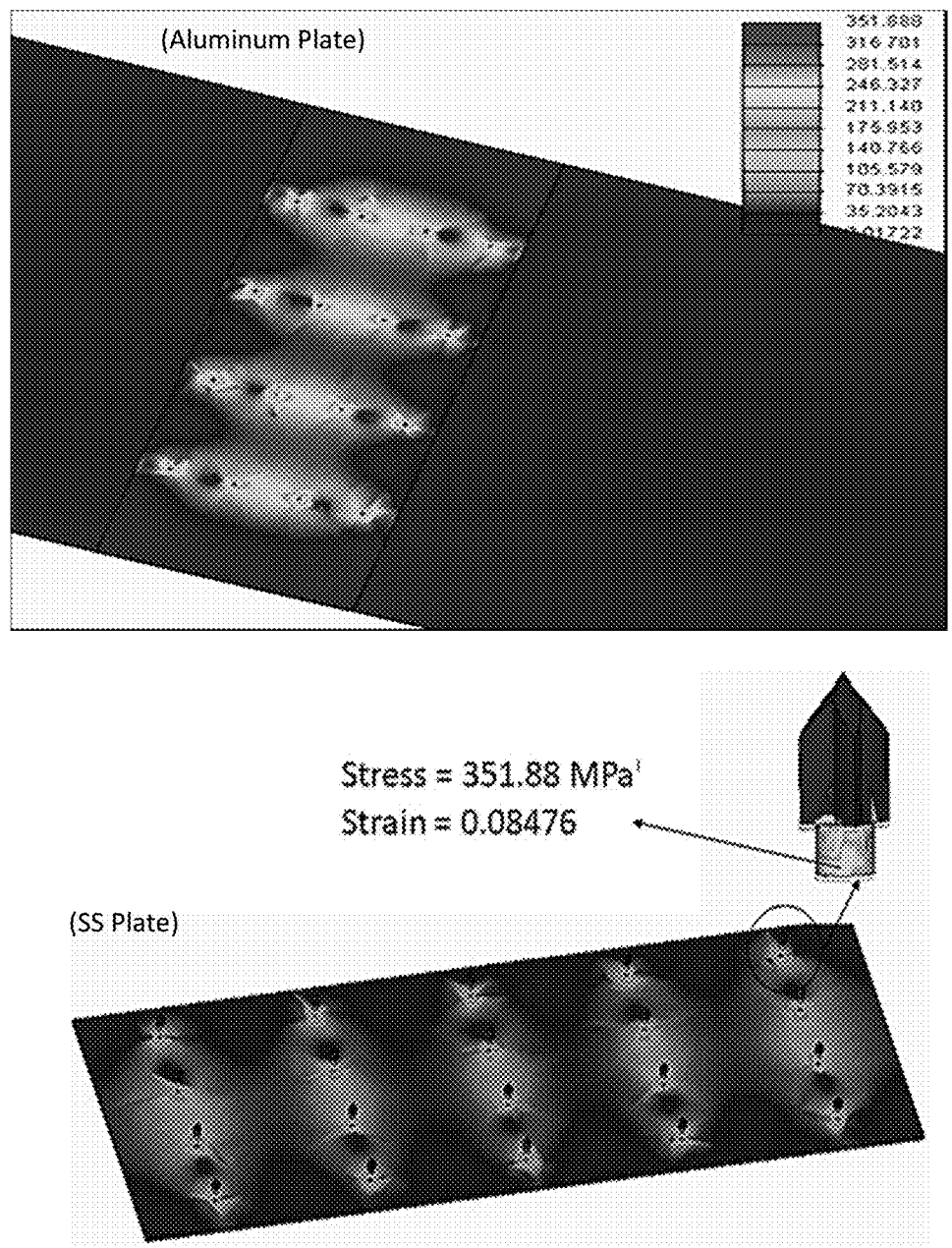
Figure 20F:
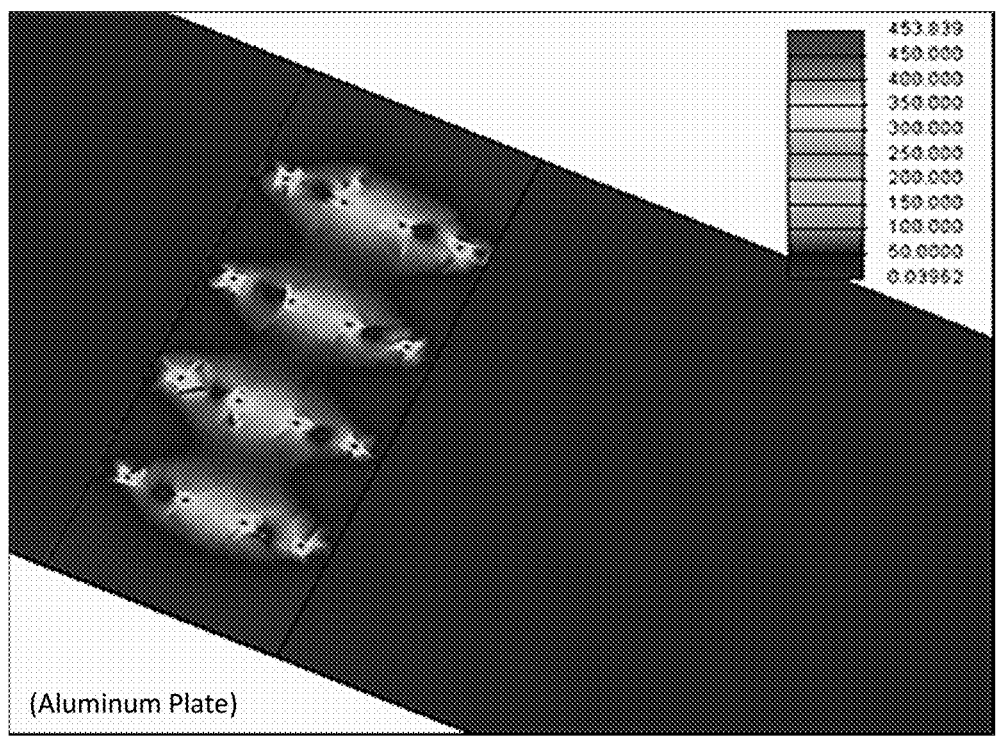
Figure 20F:
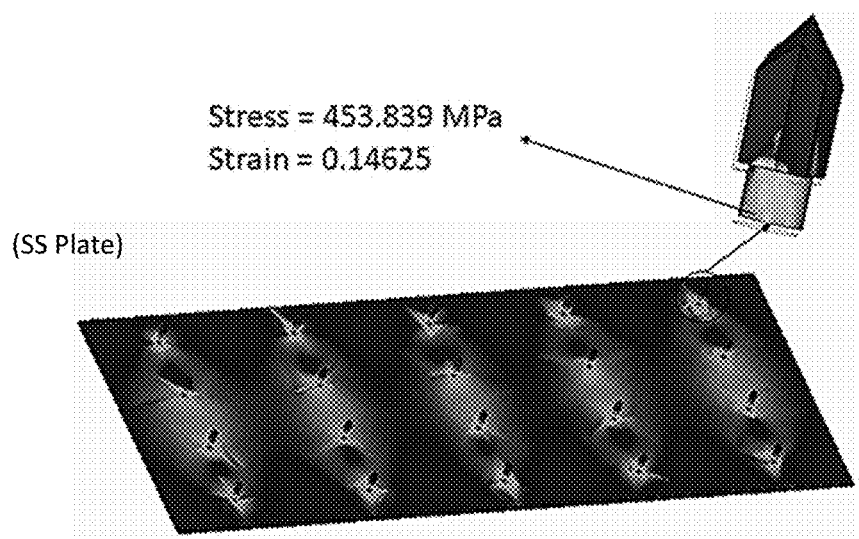

FIGS. 20A-20E show the von Mises stress distribution under tensile loading. In FIG. 20A, at 2 kN force, the stress is 216.298 MPa and the strain is 0.002875. In FIG. 20B, at 3 kN force, the stress is 225.762 MPa and the strain is 0.008485. In FIG. 20C, at 4 kN force, the stress is 242.912 MPa and the strain is 0.02029. In FIG. 20D, at 5 kN force, the stress is 280.643 MPa and the strain is 0.04316. In FIG. 20E, at 6 kN force, the stress is 352.88 MPa and the strain is 0.08476. In FIG. 20F, at 7 kN force, the stress is 453.839 MPa and the strain is 0.14625.

Certain embodiments of the devices and methods disclosed herein are defined in the above examples. It should be understood that these examples, while indicating particular embodiments of the invention, are given by way of illustration only. From the above discussion and these examples, one skilled in the art can ascertain the essential characteristics of this disclosure, and without departing from the spirit and scope thereof, can make various changes and modifications to adapt the compositions and methods described herein to various usages and conditions. Various changes may be made and equivalents may be substituted for elements thereof without departing from the essential scope of the disclosure. In addition, many modifications may be made to adapt a particular situation or material to the teachings of the disclosure without departing from the essential scope thereof.

What is claimed is:

1. A connector comprising:
   a framework having a first side and a second side; and
   an array of self-driven screws on the framework, wherein at least one of the self-driven screws comprises a first threaded portion and a second threaded portion, the first threaded portion extending from the first side to a first conical tip and the second threaded portion extending from the second side to a second conical tip, wherein the first threaded portion and the second threaded portion meet in a bracket and are capable of rotating within the bracket.

2. The connector of claim 1, wherein the first threaded portion has a first pitch, and the second threaded portion has a second pitch, wherein the first pitch and the second pitch are different.

3. The connector of claim 2, wherein the first pitch changes along a length of the first threaded portion, or the second pitch changes along a length of the second threaded portion.

4. The connector of claim 1, wherein the bracket is within a plane defined by the framework.

5. The connector of claim 1, wherein the framework is a solid, continuous sheet.

6. The connector of claim 1, wherein the first threaded portion and the second threaded portion are threaded in opposing directions.

7. The connector of claim 1, wherein the framework is a grated framework.

8. A connector comprising:
a framework having a first side and a second side; and
an array of self-driven screws on the framework, wherein at least one of the self-driven screws comprises a first threaded portion and a second threaded portion, the first threaded portion extending from the first side and the second threaded portion extending from the second side, wherein the first threaded portion and the second threaded portion meet in a bracket and are capable of rotating within the bracket, and
wherein the first threaded portion and the second threaded portion are threaded in opposing directions.

9. The connector of claim 8, wherein the first threaded portion has a first pitch, and the second threaded portion has a second pitch, wherein the first pitch and the second pitch are different.

10. The connector of claim 8, wherein the bracket is within a plane defined by the framework.

11. The connector of claim 8, wherein the framework is a solid, continuous sheet.

12. A connector comprising:
a framework having a first side and a second side; and
an array of self-driven screws on the framework, wherein at least one of the self-driven screws comprises a first threaded portion and a second threaded portion, the first threaded portion extending from the first side and the second threaded portion extending from the second side, wherein the first threaded portion and the second threaded portion meet in a bracket and are capable of rotating within the bracket, and
wherein the framework is a grated framework.

13. The connector of claim 12, wherein the first threaded portion has a first pitch, and the second threaded portion has a second pitch, wherein the first pitch and the second pitch are different.

14. The connector of claim 12, wherein the bracket is within a plane defined by the framework.

15. The connector of claim 12, wherein the framework is a solid, continuous sheet.

16. A connector comprising:
a framework having a first side and a second side; and
an array of self-driven screws on the framework, wherein at least one of the self-driven screws comprises a first threaded portion and a second threaded portion, the first threaded portion extending from the first side and the second threaded portion extending from the second side, wherein the first threaded portion and the second threaded portion meet in a bracket and are capable of rotating within the bracket,
wherein the first threaded portion has a first pitch, and the second threaded portion has a second pitch, wherein the first pitch and the second pitch are different, and
wherein the first pitch changes along a length of the first threaded portion, or the second pitch changes along a length of the second threaded portion.

17. The connector of claim 16, wherein the bracket is within a plane defined by the framework.

18. The connector of claim 16, wherein the framework is a solid, continuous sheet.

* * * * *